United States Patent [19]

Goldberg

[11] Patent Number: 4,954,392
[45] Date of Patent: Sep. 4, 1990

[54] CHEMICAL SUIT LINER

[75] Inventor: Stanley Goldberg, Providence, R.I.

[73] Assignee: Duro Industries, Inc., Fall River, Mass.

[21] Appl. No.: 444,766

[22] Filed: Dec. 1, 1989

[51] Int. Cl.⁵ .............................................. B32B 5/16
[52] U.S. Cl. .................................. 428/244; 428/253; 428/316.6; 428/317.9
[58] Field of Search .................. 428/316.6, 317.9, 244, 428/253

[56] References Cited

U.S. PATENT DOCUMENTS

* 4,454,191 6/1984 Blücher et al. ................ 428/244
  4,554,198 11/1985 Blücher et al. ................ 428/244

Primary Examiner—James J. Bell
Attorney, Agent, or Firm—Salter & Michaelson

[57] ABSTRACT

A chemical suit liner and method of making same, the liner comprising an air permeable fabric to which is bonded a chemically impregnated foam backing, the foam backing comprising a plurality of discreet foam layers that have been laminated to each other.

5 Claims, 1 Drawing Sheet

CHEMICAL SUIT LINER

BACKGROUND AND SUMMARY OF THE INVENTION

The present inVention relates generally to chemical suits, and more specifically to liners therefore, and method of making same.

Chemical suits have long been worn by persons who in the course of their work may be exposed to harmful chemical vapors, liquids and gasses. Suits of this type are worn by personnel to absorb, protect and repel harmful gaseous vapors from reaching the wearer's body. Such suits are frequently worn by military personnel and other non-military personnel who may be exposed to such vapors, such as personnel who may be employed in a clean-up capacity after chemical explosions, gas leaks, etc., where harmful vapors and fumes may exist.

A conventional chemical suit comprises a garment that completely covers the wearer's person, said garment having a liner consisting of a fabric layer having a foam backing bonded thereto. When the liner is secured to the inside of the garment, the fabric layer comprises the inner surface of the garment, i.e. in contact with the wearer, with the foam backing located intermediate the fabric and the shell of the garment. For purposes of comfort, the fabric layer is conventionally an air permeable fabric, such as a nylon tricot, and the foam backing is flame-laminable polyurethane. The chemical with which the foam backing is impregnated preferably is an activated carbon, and it is the loading or filling of the foam material with the carbon that prevents penetration therethrough of harmful gaseous vapors. It is therefore critical that sufficient carbon be present throughout the lining in order to achieve complete and effective protection for the wearer. Since the chemical with which the foam is impregnated is rendered substantially ineffective by the presence of moisture, the outer garment shell is of a water-repellent material.

In the manufacture of chemical suit liners of the type above described, i.e. liners comprising an air permeable fabric layer having bonded thereto a foam backing impregnated with a suitable protective chemical, such as activated carbon, it has been found that the weight and density of the foam layer must be maintained above a predetermined minimum level in order to insure sufficient pickup or loading of the protective chemical therein. Expressed differently, if at any locations the foam backing is too porous, i.e. does not have sufficient weight and density, then at those locations an insufficient amount of the protective chemical will be picked up by the foam, thus rendering the liner ineffective for its intended purpose at those locations. This is particularly true since the foam backing is necessarily quite thin in order that the suit will not be too bulky so as to unnecessarily inhibit movement of the wearer, it being noted that the foam backing is normally in the approximate range of one-tenth of an inch in thickness. The problem that exists, however, is that the cellular structure of foams of polyurethane and the like are never uniform, since thin foam layers of this type are traditionally made by the peeling of round buns of such foam, as a result of which the peeling machine that cuts the thin foam sheet from the bun may at certain spaced intervals cut into the cellular interior of the foam in such a way that the porosity of the foam at that particular location may be relatively high. This phenomena is known in the foam industry as "banding" and since one never knows when or where in the elongated foam strip such "banding" will exist, it becomes incumbent on the manufacturers of chemical suit liners to carefully test the foam throughout its length in order to locate and eliminate those areas of the foam, or if preferable, to carefully test the completed lining in order to locate and eliminate areas that do not meet minimum protective standards. This obviously requires expensive and time-consuming testing procedures, and results in a higher percentage rejection rate of the liners than is desirable.

The present invention overcomes the problems that result from the above-discussed "banding" phenomena that inherently exists in the manufacture of elongated sheet foam, thus providing a foam backing wherein the possibility of areas thereof having insufficient density and weight is tremendously minimized. This is done by making the foam backing of a plurality of discreet layers, preferably two, which layers are laminated to each other to form the backing, which backing is then bonded to the fabric layer. Since the so-called "banding" in the elongated foam sheeting exists at widely spaced intervals, it will be understood that if the foam backing is made of two layers rather than one, at those areas where "banding" exists, such "banding" will exist in only one-half the thickness of the backing, and since the other half will possess greater weight and density, the overall backing, even at those areas, will possess sufficient weight and density so as to result in sufficient loading or pickup of the protective chemical. The separate foam layers are preferably of a thickness approximately one-half the thickness of the conventional one-layer foam backing, or perhaps slightly greater, it only being important that the thickness of the combined layers not exceed the thickness specification for liners of this type. In the manufacture of the liner of the present invention, a single foam layer may be bonded to the fabric layer and then the second foam layer laminated to the first one. Alternatively, the two foam layers may be laminated to each other to form the backing, and then the backing may be bonded to the fabric layer, or it may be preferable to make the lining in a single pass, i.e. by simultaneously laminating the two foam layers to each other, and at the same time bonding the laminated backing to the fabric layer. In each case, the impregnation of the liner with the protective chemical takes place after the foam backing has been bonded to the fabric layer.

It is therefore an object of the present invention to provide a liner for chemical suits wherein little likelihood exists that any portions of the liner do not meet required protective standards.

Another object is the provision of a liner for chemical suits wherein the foam backing thereof is constructed of a plurality of discreet foam layers that are laminated to each other.

Another object is the provision of a liner for chemical suits wherein the construction of the liner and the method of making same requires less extensive testing and minimizes the rejection rate of the liner.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
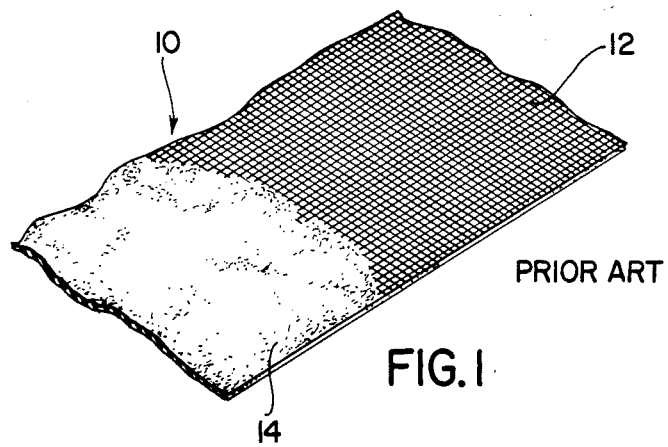
FIG. 1 is a fragmentary elevational view of a liner for chemical suits as heretofore constructed.
Figure 3:
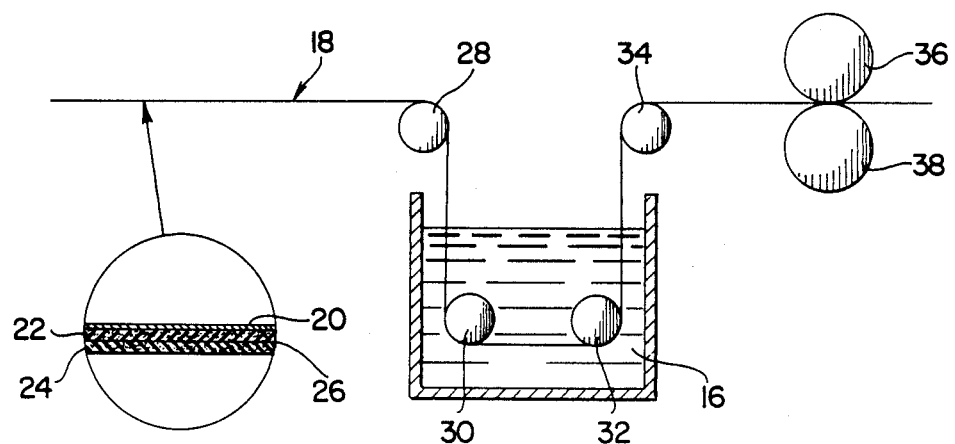
FIG. 3 is a schematic view illustrating impregnation of the liner with a protective chemical, said view also showing an enlarged cross-sectional view of the liner.

FIG. 1 of the drawings shows a liner 10 for chemical suits comprising a fabric layer 12 of any suitable air permeable fabric, although nylon tricot has been found to be acceptable and desirable because of its relatively low cost and relatively high strength. Other air permeable fabrics, such as a polyester or rayon knit, could also be used. A foam backing 14, such as a polyester-based polyurethane flame laminable foam is bonded to fabric layer 12 to provide the composite liner 10. The liner 10 is then impregnated with a protective chemical, such as activated carbon, by passing the liner 10 through an activated carbon slurry as shown at 16 in FIG. 3. It will be understood that the activated carbon absorbs, protects against and repels the passage of harmful gaseous vapors through the liner.

In the normal procedure, the liner 10 is sold or supplied to the manufacturer who produces the chemical suits, the liner 10 being incorporated into the chemical suit so that the fabric layer 12 is inwardly disposed, i.e. is in contact with the wearer, and so that the foam backing 14 is sandwiched between the fabric layer 12 and the outer shell of the garments (not shown).

It is absolutely critical that the liner 10, and particularly foam backing 14 thereof, have the capacity of picking up or being loaded with a sufficient amount of the protective chemical, such as the activated carbon, so as to prevent penetration therethrough of the harmful gaseous vapors. Since the density, weight and porosity of the foam backing 14 determines the amount of protective chemical that it can pick up, it is essential that the foam backing, at all locations, be of sufficient weight and density, and that the porosity of the foam backing at all locations not be too high. However, as previously explained, in the normal manufacture of urethane foam sheets wherein the sheets are formed by peeling a round bun, widely-spaced portions of the foam may exhibit a phenomena known as "banding" wherein the weight and density of such portions is unaccountably low and the porosity of same unaccountably high. Because of this, these widely-spaced portions do not have the capacity of picking up or being loaded with a sufficient amount of the protective chemical to meet minimum safety standards. Thus, there can either be a relatively high rejection rate of the chemical suits, or else the liner manufacturer must do extensive testing in order to locate and eliminate those portions of the liner where the foam backing is too porous because of the so-called "banding" phenomena.

Figure 2:
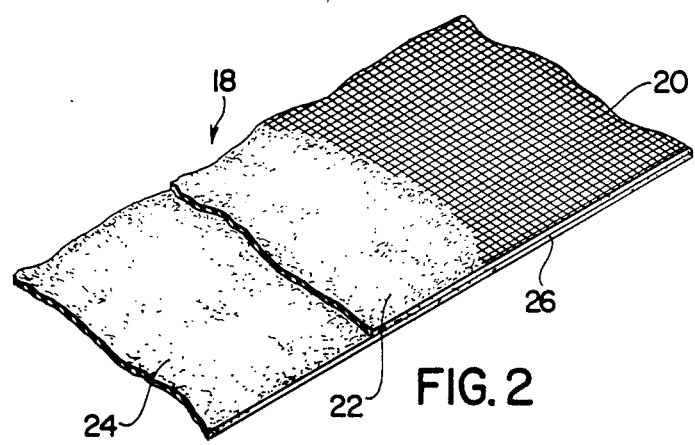
FIG. 2 is a fragmentary elevational view of a liner for chemical suits constructed in accordance with the present invention.

Referring now to FIG. 2, a liner shown generally at 18 illustrates the present invention. The liner 18 comprises a fabric layer 20 identical to the fabric layer 12 above discussed, and hence layer 20 is preferably a nylon tricot knit, although other suitable fabrics may be employed. In the liner 18, the foam backing, instead of being a single layer of foam as at 14 in FIG. 1, comprises two discreet layers 22 and 24 which have been bonded to each other, preferably by conventional flame-laminating techniques. Although for purposes of illustration, a seam 26 is shown between layers 22 and 24, it will be understood that once these layers have been laminated to each other, they become one integral layer, and no seam is visible. It is, however, an essential feature of the present invention that the foam backing be constructed of discreet layers that are laminated to each other, as just described. The thickness of the layers 22 and 24 may be approximately one-half the thickness of the layer 14 shown in FIG. 1, or slightly greater than one-half, it only being important that the overall thickness of the foam backing not exceed permissible standards.

By having the foam backing of the liner 18 made from two discreet layers, it will be apparent that even though each layer at widely-spaced intervals may be of relatively high porosity due to the aforesaid "banding" phenomena, only one-half of the thickness of the backing will be so characterized because it is highly unlikely that two areas of high porosity would end up being aligned with each other. It has been found that in those areas where the "banding" phenomena exists in either layer 22 or layer 24, the fact that the other half of the backing at that location has the normal desired weight, density and porosity enables sufficient pickup or loading of the protective chemical at those areas so as to effectively prevent penetration through the liner 18 of harmful gaseous vapors.

The liner 18 is impregnated with a protective chemical, such as activated carbon, by conventional means, such as by feeding the liner 18 through an activated carbon slurry bath 16 by passing the liner over and under suitable idler rollers 28, 30, 32, and 34, and then passing the liner between pressurized nip rollers 36, 38 which force the activated carbon slurry into the interstices of the liner. After passing through the nip rollers 36, 38, the liner is dried by any suitable means.

From a manufacturing standpoint, it is immaterial whether the foam layers 22, 24 are first laminated to each other and then to fabric layer 20, or whether foam layer 22 is first bonded to fabric layer 20, and then laminated to layer 24, or whether the lamination of layers 22 and 24 to each other and to fabric layer 20 is done in one pass, i.e. simultaneously. The important and critical factor is that the foam backing is made from at least two discreet layers as opposed to being constructed of one thicker layer, as has heretofore been done.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A chemical suit liner comprising an air permeable fabric layer, a foam backing bonded to said fabric layer and completely covering a surface thereof, said foam backing being impregnated with a chemical that prevents penetration of harmful gaseous vapors therethrough, said foam backing consisting of a plurality of foam layers laminated to each other.

2. In the chemical suit liner of claim 1, said chemical comprising activated carbon.

3. In the chemical suit liner of claim 1, said fabric layer consisting of a nylon tricot knit.

4. In the chemical suit liner of claim 1, said foam backing consisting of a flame laminable polyurethane foam.

5. In the chemical suit liner of claim 1, said foam backing consisting of two foam layers of substantially equal thickness.

* * * * *